Figure 1:
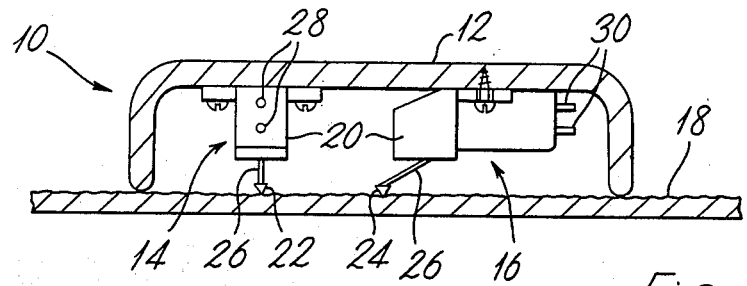

United States Patent [19]

Page

[11] 4,303,914
[45] Dec. 1, 1981

[54] VISUAL DISPLAY INPUT DEVICE

[75] Inventor: Ian Page, Romford, England

[73] Assignee: National Research Development Corporation, London, England

[21] Appl. No.: 17,144

[22] Filed: Mar. 2, 1979

[30] Foreign Application Priority Data

Mar. 6, 1978 [GB] United Kingdom ............... 8791/78

[51] Int. Cl.³ .............................................. G08B 5/36
[52] U.S. Cl. ...................... 340/706; 178/18; 310/311; 310/338; 340/710; 369/144
[58] Field of Search ............ 340/710, 146.3 E, 706; 178/18; 73/105; 310/311, 338; 179/100.41 P

[56] References Cited

U.S. PATENT DOCUMENTS

| | | | |
|---|---|---|---|
| 1,798,750 | 3/1931 | Nicolson | 179/100.41 P |
| 2,096,826 | 10/1937 | Schrader | 310/338 |
| 2,335,390 | 11/1943 | Crist | 73/105 |
| 3,231,861 | 1/1966 | French | 340/149 |
| 3,383,914 | 5/1968 | MacArthur | 310/338 X |
| 3,528,295 | 9/1970 | Johnson et al. | 178/18 X |
| 3,541,541 | 11/1970 | Engelbart | 178/18 X |
| 3,544,774 | 12/1970 | Peklenik | 73/105 X |
| 3,618,019 | 11/1971 | Nemirovsky et al. | 178/18 X |
| 4,078,226 | 3/1978 | Eernisse et al. | 310/311 X |

FOREIGN PATENT DOCUMENTS

| | | |
|---|---|---|
| 610315 | 10/1948 | United Kingdom . |
| 961914 | 6/1964 | United Kingdom . |
| 1063381 | 3/1967 | United Kingdom . |
| 1239558 | 7/1971 | United Kingdom . |

*Primary Examiner*—David L. Trafton
*Attorney, Agent, or Firm*—Cushman, Darby & Cushman

[57] ABSTRACT

An input device for a computer controlled visual display enables an operator to instruct the shift of a display element in a chosen direction by hand movement of the input device sensor in an analogous direction over a plane surface. The sensor includes a conventional piezo-electric audio pick-up which produces a succession of unidirectional pulses when the stylus is drawn across a microscopically textured surface such as a sheet of paper, the polarity of the pulses being indicative of the direction of motion along a selected axis. A second pick-up is arranged to give a maximum response to motion along an orthogonal axis and for the component of motion on each axis a bi-directional pulse counter enables the direction of motion to be determined by a comparison of the counts held in successive time intervals.

9 Claims, 2 Drawing Figures

VISUAL DISPLAY INPUT DEVICE

The invention relates to a visual display input device of particular application in providing an interactive input to a computer having an associated visual display, for the designation of an elemental area in the display.

A visual display unit is a convenient form of monitor for the manipulation and selection of computer-controlled data by an operator who need have no knowledge of the programming of the computer. Thus a pictorial display may have features added or may be re-orientated; or from a displayed menu of available computer functions, one may be selected and activated. All such operations require the designation of an elemental area of the display, typically by moving a 'cursor' which is itself displayed. Computer input devices are available for communicating the co-ordinates of the designated element in terms of data generated by the action of analogous positioning of a hand-held X—Y transducer but the cost of the apparatus is such as to restrict its use to specialized applications. There is however a need for an input device for interaction with a visual display which does not require the computation of co-ordinates and could be made widely available at lower cost.

According to the invention an input device for use in conjunction with a visual display comprises sensing-means adapted for hand-controlled motion over a plane surface, the sensing means being responsive to the texture of the surface during such motion in either direction along a selected axis to produce a succession of unidirectional electrical pulses the polarity of which is indicative of the direction of motion.

Preferably the sensing means is arranged to be independently responsive to such motion along an axis orthogonal to the selected axis to produce a similar succession of pulses.

The device may include output means comprising means for storing in respect of each axis a digital value derived from the unidirectional pulses which is incremented as a result of motion in one direction and decremented as a result of motion in the opposite direction.

In an interactive visual display system such an input device is controlled by an operator and a computer may be arranged to determine the stored value in succesive time intervals and thereby the direction of motion of the sensing means and to cause an element of the display to move in a corresponding direction.

The sensing means may include for each axis a piezoelectric crystal and a stylus which in use lies in contact with the plane surface, the stylus being so arranged that during motion along the relevant axis a stress is transmitted to the crystal in a direction determined by the direction of motion of the stylus whenever such motion is impeded by a textural feature of the surface.

The stylus may be resiliently mounted within a housing adapted to be hand-held and so arranged that during motion of the housing in sliding contact with the plane surface a substantially constant contact pressure and inclination is maintained between the stylus and the surface.

Figure 2:
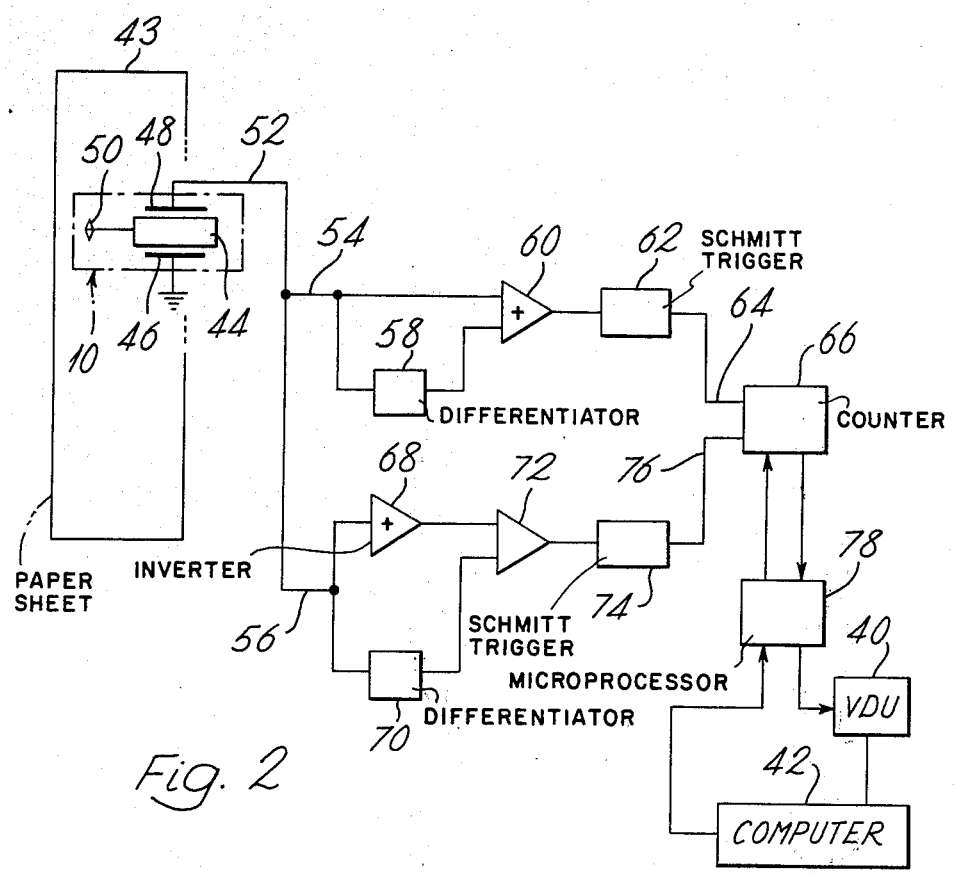

An embodiment of the invention will be described with reference to the accompanying drawing in which:

FIG. 1 represents diagrammatically in partial cross-section a sensor assembly for an input device in accordance with the invention; and FIG. 2 represents schematically an interactive computer-controlled visual display system incorporating the input device of FIG. 1.

With reference to FIG. 1 a sensor assembly 10 includes a housing 12 and sensing elements 14, 16. The housing 12 conveniently has the form of a flattened dome, open on the underside, and is made from metal or plastics material of any suitable size and shape to be loosely hand-held for sliding across a surface 18. Each of the sensing elements 14, 16 is a conventional crystal pick-up for monophonic or stereophonic record reproduction in which a piezoelectric crystal (not shown) is contained in a body moulding 20 and a stylus 22 or 24, is carried by a mounting strip 26. As is well known for such pick-ups the mounting is so arranged that lateral deflection of the stylus causes stress to be transmitted to the faces of the crystal such that a potential difference appears between the faces. The potential difference is sensed by means of suitable connections to metallized areas on the crystal faces. Such connections are provided in the assembly 10 by lead-wires 28 to element 14 and lead-wires 30 to element 16. The sign and magnitude of the potential difference depend upon the direction and magnitude of deflection of the stylus. In the arrangement illustrated, stylus 22 of element 14 (which is viewed in end elevation) produces only a noise signal on being deflected in a plane perpendicular to the plane of the paper. Similarly, the mounting is relatively resilient in the vertical direction in the plane of the paper and deflection in this direction produces no signal. Deflection to left or right in the plane of the paper however produces a potential the sign of which is determined by the direction of deflection and if the stylus is momentarily deflected and then released a unidirectional pulse is obtained. Stylus 24 of element 16 is mounted on an axis perpendicular to that of stylus 22 and so produces a pulse following deflection and release in front of or behind the plane of the paper.

The invention is based on the realization that a stream of pulses can be produced by means of the sensor assembly 10 if a stylus is moved along a selected axis in contact with a surface containing features of texture which are thought to alternately deflect and release the stylus in the way suggested. The selected axis for the stylus is of course that for which the mounting is arranged to give a piezoelectric output. Thus in use the orthogonal axes are orientated for convenience by appropriate positioning of the sensor assembly 10. In considering the effect of texture three cases can be distinguished. A stylus 22 or 24 may be drawn across a smooth surface such as a glass plate with no disturbance and therefore producing no signal. A fine grating might be provided to produce a regularly pulsed signal the number of pulses being an exact representation of distance. This would be a simple facility to provide on one axis but two axes could not readily be provided in a single surface. In carrying out the invention however it is recognized that the surface features need not be regular and that the surface of a sheet of unglazed or cartridge paper, for example, is sufficiently rough to produce the required effect. The number of pulses does not represent distance moved by the sensor but the sign of each pulse indicates without ambiguity the direction of motion and only this information is required. Other suitable surfaces can readily be selected by simple experiment with the intended sensing means. The housing 12 is dimensioned so that when not in contact with a surface the styli 22, 24 project slightly below the plane of the lower edge of the housing. In use, the vertical resilience of the mounting is then sufficient to ensure uniform contact pressure of the styli when the housing is pressed lightly on to a plane surface.

With reference to FIG. 2 the application of the input device will be described in relation to a visual display system.

A visual display unit (VDU) 40 is controlled by a computer 42 in accordance with program steps initiated by the operation of input devices such as a keyboard (not shown). For the manipulation of a cursor in the display the input device 10, as described with reference to FIG. 1, is moved over a rough surface, such as a sheet of paper 43, and the pulses produced are processed to provide computer 42 with instructions to move the cursor analogously to right or left, up or down. Since an operator can view the VDU continuously the input device 10 is moved as far as is necessary on each axis to produce the desired position of the cursor without regard to irregularities of scale between the movement of device 10 and of the cursor. Any position on the field can of course be approached directly. Each of the elements 14, 16 responds simultaneously to the component of motion along its allotted axis and it is not necessary to make X and Y movements in sequence.

In FIG. 2 a schematic circuit diagram illustrates the processing of pulses in a single channel, representing the Y axis. A second identical channel (not shown) would represent the X axis. The operative elements of device 10 are indicated diagrammatically by a crystal 44 with conducting faces 46, 48 and a stylus 50 arranged for Y deflection. An unbalanced output connection 52 from face 48 is shown, with face 46 connected to earth. From connection 52, positive pulses are accepted in a channel 54 and negative pulses in a channel 56.

Pulses produced by crystal 44 are likely to be irregular in shape and the initial rise is identified by differentiating the signal in channel 54 in a differentiator 58 and adding the result to the unprocessed signal in a summing amplifier 60. The output from amplifier 60 is input to a Schmitt trigger 62 which provides a shaped pulse to an input 64 of a reversible counter 66 whenever a predetermined threshold level is exceeded. Input 64 increments the value stored in counter 66 and represents (say) an upward movement of stylus 50. Negative input pulses to channel 56 are inverted by an inverter 68 but are otherwise processed in a similar way to the positive pulses in channel 54 by means of a differentiator 70, summing amplifier 72 and Schmitt trigger 74 for input to an input 76 of counter 66. Input 76 decrements the value stored in counter 66 and thus represents a downward movement of stylus 50. Counter 66 is conveniently of 8 bit capacity but to allow for the possibility of missed or wrongly assigned pulses only the most significant bits are taken into account. Via a microprocessor 78 the computer 42 scans the counter 66 at intervals in the order of ten milliseconds. The values observed on successive scans are compared and if a decrement is found the cursor of the VDU display is shifted downwards. Similarly the cursor is shifted upwards in response to an observed increment or held stationary if the value is unchanged. One or more press-button switches (not shown) will often be mounted on the housing of device 10 for convenience in initiating selected computer functions related to the positioning of the cursor at particular points in the display.

Typically a display will contain an array of 80×24 elemental areas and a selected one can rapidly be designated by analogous movement of the device 10. It should be noted that since only the direction of movement of device 10 is significant, and not its absolute position, the operator is free to lift the device 10 from the sheet of paper 43 and to replace it at any position which enables the desired direction of movement to be continued. For the same reason the capacity of counter 66 need only be large enough to hold the count representing a small range of movement. Interrogation by the computer 42 can be so arranged that no ambiguity as to direction will arise provided counter 66 overflows no more than once in the interval between interrogations.

In processing the pulses from output 52 to derive a differential count it will be appreciated that the arrangement shown and described for channels 54, 56 is by way of example and that other circuits may be designed which are effective for the purpose.

The use of the input device interactively between a computer and a VDU has been described for simplicity in terms of the positioning of a cursor. It will be apparent however that the device affords great versatility in the direct manipulation of features of the display.

I claim:

1. A visual display input device for producing a signal representing a direction of motion to be reproduced in said display comprising:

sensing means adapted for hand-controlled motion over a plane surface, the sensing means being responsive to the texture of the surface during such motion in either direction along a selected axis to produce said signal consisting of a succession of unidirectional electrical pulses, the polarity of the pulses being indicative of the direction of motion; and means for maintaining said sensing means in a fixed orientation with respect to said surface so that said sensing means is insensitive to pressure normal to said surface.

2. A device according to claim 1, the sensing means being independently responsive to such motion along an axis orthogonal to the selected axis to produce a similar succession of pulses.

3. A device according to claim 1 or claim 2 including output means responsive to such pulses to produce for each axis a signal from which the state of motion of the sensing means is derivable.

4. A device according to claim 3 in which the output means comprises means for storing a digital value, means for incrementing the value in response to motion in one direction and means for decrementing the value in response to motion in the opposite direction.

5. A device according to claim 1 or claim 2 in which the sensing means comprises for each axis of motion a stylus which in use is maintained in contact with the plane surface, and a piezoelectric crystal, the stylus being so arranged that during motion along the relevant axis a stress effective to induce a piezoelectric voltage across the crystal is transmitted to the crystal in a direction determined by the direction of motion whenever such motion is impeded by a textural feature of the surface.

6. A device according to claim 5 in which the stylus is resiliently mounted within a housing such that during motion of the housing in sliding contact with the plane surface a substantially uniform contact pressure and inclination is maintained between the stylus and the surface.

7. A computer controlled display system incorporating a device according to claim 2, computer input means for determining the direction of motion of the sensing means and computer output means to cause a display element to be deflected analogously with such motion.

8. A display system according to claim 7 in which the computer input means includes means for storing for each axis of motion a digital value, means for incrementing the value in response to each pulse of one polarity means for decrementing the value in response to each pulse of the opposite polarity, and means for repetitively reading out the digital value and means for comparing successive readings to determine the direction of motion along the relevant axis.

9. A method of moving an image on a visual display in response to a signal representing a direction of motion comprising the step of:

moving input means in either direction along a first axis over a textured surface, said means being responsive to said textured surface during motion for producing said signal consisting of a succession of unidirectional electrical pulses, the polarity of the pulses being indicative of the direction of motion; and moving said image along a second axis in response to said signal in a direction related to said polarity.

* * * * *